(12) United States Patent
Huang

(10) Patent No.: US 6,194,998 B1
(45) Date of Patent: Feb. 27, 2001

(54) POWER SUPPLY UNIT FOR A PRESSURE-SENSING DEVICE THAT IS CONCEALED BY A TIRE OF A VEHICLE WHEEL

(76) Inventor: Teng-Yi Huang, NO. 4-2, Lane 30, Wu-Chuan St., Pan-Chiao City, Taipei Hsien (TW)

( * ) Notice: Subject to any disclaimer, the term of this patent is extended or adjusted under 35 U.S.C. 154(b) by 0 days.

(21) Appl. No.: 09/299,518

(22) Filed: Apr. 26, 1999

(30) Foreign Application Priority Data

Mar. 30, 1999 (TW) .................................................. 88204840

(51) Int. Cl.[7] ............................. B60C 23/00; B60C 23/02
(52) U.S. Cl. ......................... 340/442; 340/445; 73/146.5
(58) Field of Search ................................. 340/442, 445; 73/146.5, 146.8; 116/34 R; 200/61.22, 61.25; 137/233

(56) References Cited

U.S. PATENT DOCUMENTS

| | | | |
|---|---|---|---|
| 4,048,614 | 9/1977 | Shumway | 340/58 |
| 4,737,760 | 4/1988 | Huang et al. | 340/58 |
| 4,814,745 | * 3/1989 | Wang | 340/442 |
| 4,945,337 | * 7/1990 | Huang | 340/442 |
| 5,289,161 | 2/1994 | Huang | 340/447 |
| 5,604,481 | * 2/1997 | Lin | 340/442 |
| 5,694,111 | 12/1997 | Huang | 340/442 |
| 5,754,101 | * 5/1998 | Tsunetomi et al. | 340/442 |
| 5,798,689 | 8/1998 | Huang | 340/447 |
| 5,856,619 | * 1/1999 | Wang | 73/146.5 |
| 6,006,600 | * 12/1999 | Cheng | 73/146.5 |
| 6,034,596 | * 3/2000 | Smith et al. | 340/445 |

* cited by examiner

Primary Examiner—Jeffrey Hofsass
Assistant Examiner—John Tweel, Jr.
(74) Attorney, Agent, or Firm—Ladas and Parry

(57) ABSTRACT

A power supply unit is adapted for use with a pressure-sensing device that is mounted on a wheel rim inside an airtight chamber confined by the wheel rim and a pneumatic tire. The power supply unit includes a valve housing, an air valve member, and a battery housing. The valve housing is mounted on the wheel rim with an inner end portion thereof extending into the airtight chamber and with an outer end portion thereof extending outwardly of the wheel rim. The valve housing is provided with a housing conductor for electrical connection with the pressure-sensing device. The air valve member is mounted in the valve housing, and includes a spring-loaded valve stem with a conductive stem body that is connected electrically to the pressure-sensing device, and that is electrically insulated from the housing conductor. The battery housing is mounted on the outer end portion of the valve housing and receives a battery cell therein. The battery housing has first and second battery contacts to interconnect electrically first and second terminals of the battery cell with the housing conductor and the stem body, respectively.

14 Claims, 6 Drawing Sheets

POWER SUPPLY UNIT FOR A PRESSURE-SENSING DEVICE THAT IS CONCEALED BY A TIRE OF A VEHICLE WHEEL

BACKGROUND OF THE INVENTION

1. Field of the Invention

The invention relates to a pressure-sensing device for a vehicle wheel, more particularly to a power supply unit for a pressure-sensing device that is concealed by a tire of a vehicle wheel.

2. Description of the Related Art

U.S. Pat. No. 4,048,614 discloses a tire pressure alarm system for a vehicle wheel. The alarm system is mounted on an inner end of an air inlet valve that extends into an airtight chamber confined by a wheel rim and a tire. The alarm system is responsive to air pressure inside the chamber so as to generate a radio signal when the air pressure is at a predetermined low pressure.

U.S. Pat. No. 5,798,689 discloses a pressure gauge for a vehicle wheel. The pressure gauge includes a casing formed with an aperture and secured to the wheel rim such that the casing is concealed by a tire on the wheel rim. A signal generating device is disposed in the casing, and includes a pressure-sensing unit which generates an analog voltage signal that varies in accordance with the pressure entering the aperture, a signal converting unit which converts the analog voltage signal from the pressure-sensing unit into a digital output signal, an encoder unit which compares the digital output signal from the signal converting unit with high and low pressure limits of a normal operating pressure range and which generates a pressure signal inclusive of the digital output signal and an identification code unique to the pressure gauge when the digital output signal is not within the normal operating pressure range, and a signal transmitter circuit which transmits the pressure signal from the encoder unit wirelessly. A receiver device includes a signal receiver circuit to receive the pressure signal transmitted by the pressure gauge, a decoder unit to receive and decode the pressure signal from the signal receiver circuit, and a display unit controlled by the decoder unit so as to indicate thereon which one of the vehicle wheels is under- or over-inflated and the pressure inside the under- or over-inflated one of the vehicle wheels.

The alarm system of U.S. Pat. No. 4,048,614 and the pressure gauge of U.S. Pat. No. 5,798,689 incorporate a power source, such as a battery cell, that is also concealed by the tire of the vehicle wheel. Thus, when the stored power of the power source has been used up, there is a need to remove the vehicle wheel from the vehicle chassis, deflate the tire, remove the tire from the wheel rim, and open the alarm system or the pressure gauge before replacement of the power source can be conducted. As such, replacement of the power source is a very complicated and inconvenient task.

SUMMARY OF THE INVENTION

The object of the present invention is to provide an easy-to-replace power supply unit for a pressure-sensing device that is concealed by a tire of a vehicle wheel.

Accordingly, the power supply unit of the present invention is adapted for use with a pressure-sensing device for a vehicle wheel. The vehicle wheel includes a wheel rim and a pneumatic tire mounted on the wheel rim so as to confine an airtight chamber therewith. The pressure-sensing device is mounted on the wheel rim inside the airtight chamber and is concealed by the pneumatic tire. The power supply unit comprises a tubular valve housing, an air valve member and a battery housing.

The tubular valve housing has an outer end portion, an inner end portion and an intermediate portion between the outer and inner end portions. The valve housing confines a longitudinal air passage that extends from the outer end portion through the inner end portion. The intermediate portion is adapted to be mounted on the wheel rim in an airtight manner such that the inner end portion extends into the airtight chamber and such that the outer end portion extends outwardly of the wheel rim. The valve housing is provided with a housing conductor that extends from the outer end portion to the inner end portion and that is adapted to be connected electrically to the pressure-sensing device.

The air valve member is mounted in the air passage of the valve housing and is operable so as to control air flow through the air passage. The air valve member includes a spring-loaded valve stem with a conductive stem body that is adapted to be connected electrically to the pressure-sensing device, and insulation means for electrically insulating the stem body from the housing conductor.

The battery housing is mounted on the outer end portion of the valve housing and is adapted to receive a battery cell therein. The battery housing is provided with electrically isolated first and second battery contacts adapted to connect electrically and respectively with first and second terminals of the battery cell when the battery cell is received in the battery housing. The first and second battery contacts establish electrical connection with the housing conductor and the conductive stem body, respectively, when the battery housing is mounted on the outer end portion of the valve housing.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENT

Figure 1:
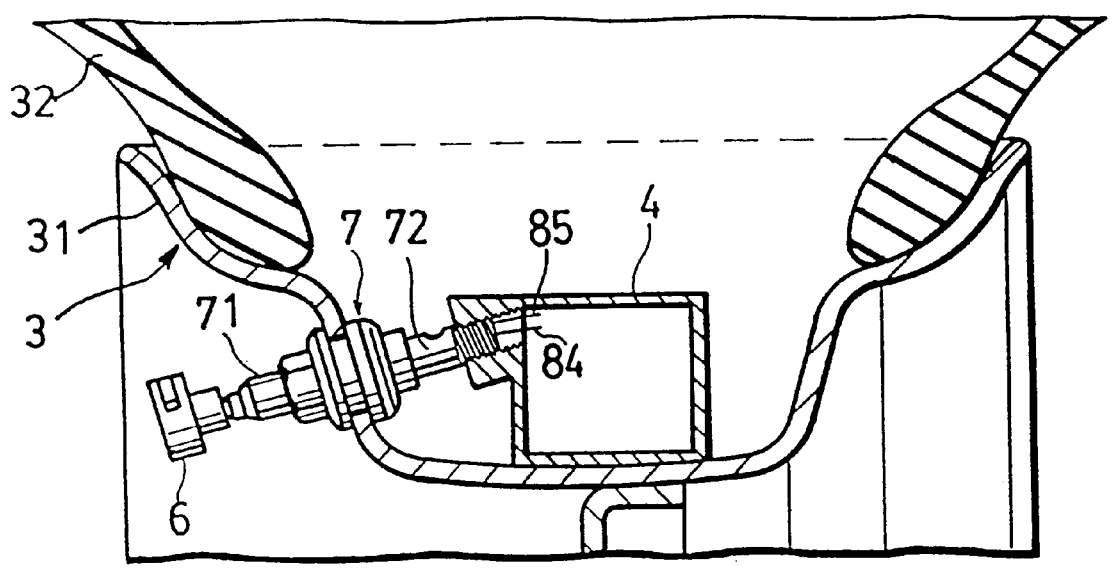
FIG. 1 is a schematic, partly sectional fragmentary view illustrating the first preferred embodiment of a power supply unit for a pressure-sensing device that is concealed by a tire of a vehicle wheel according to the present invention.
Figure 2:
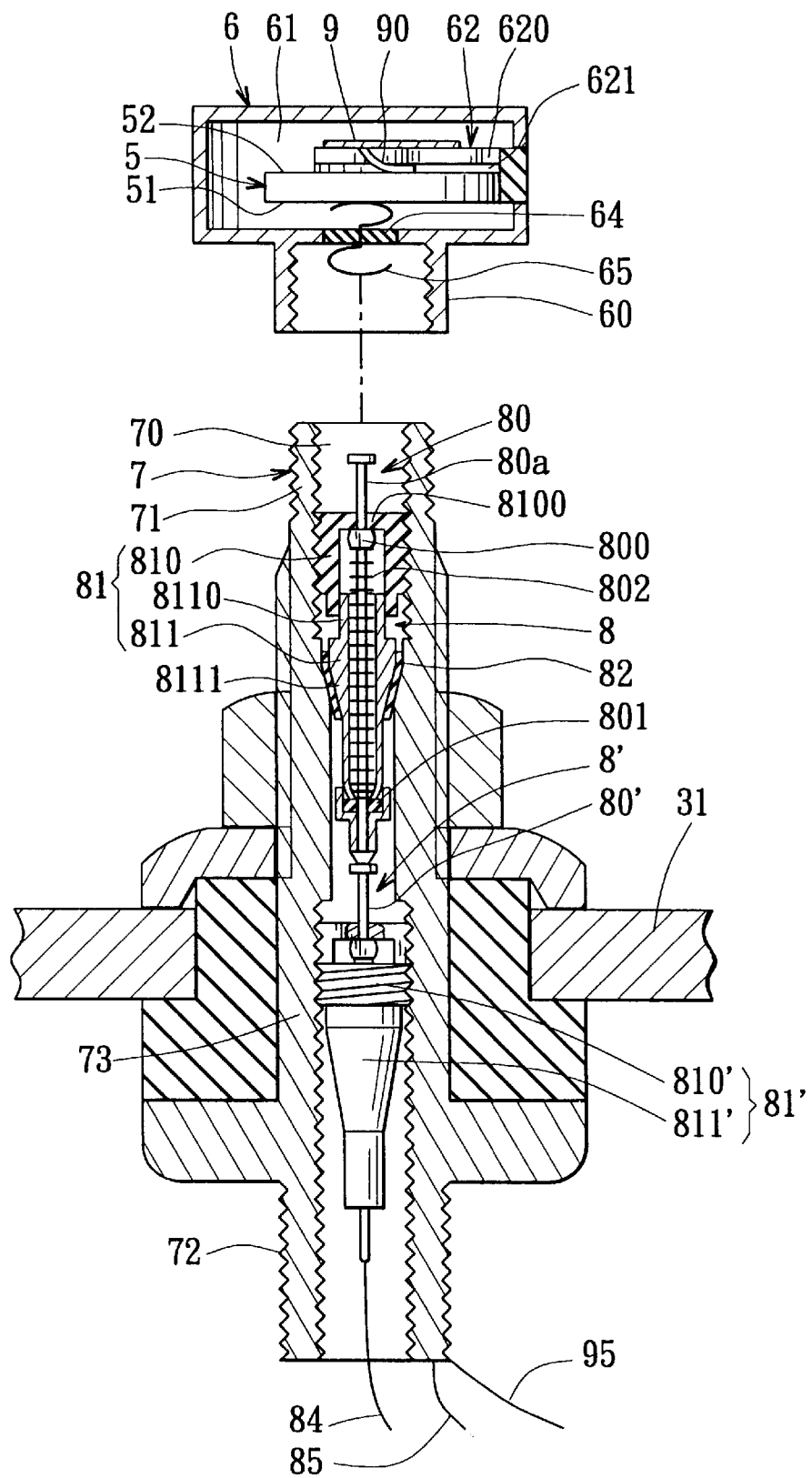
FIG. 2 is a schematic, partly exploded sectional view of the first preferred embodiment.

Before the present invention is described in greater detail, it should be noted that like elements are denoted by the same reference numerals throughout the disclosure.

Referring to FIGS. 1 to 4, the first preferred embodiment of a power supply unit according to the present invention is shown to be adapted for use with a pressure-sensing device 4 that is mounted on a vehicle wheel 3. The vehicle wheel 3 includes a wheel rim 31 and a pneumatic tire 32 mounted on the wheel rim 31 in a conventional manner so as to confine an airtight chamber therewith. The pressure-sensing device 4 is mounted on the wheel rim 31 and is disposed inside the airtight chamber so as to be concealed by the pneumatic tire 32. The pressure-sensing device 4 is conventional in construction, and will not be detailed herein for the sake of brevity. Examples of the pressure-sensing device 4 that can be applied with the power supply unit of this invention are those disclosed in the aforementioned U.S. Pat. Nos. 4,048,614 and 5,798,689.

The power supply unit of the first preferred embodiment includes a tubular valve housing 7, an air valve member 8, a biasing member 8', and a battery housing 6 adapted to receive a battery cell 5 therein.

The valve housing 7 is made of an electrically conductive material, and has an outer end portion 71, an inner end portion 72, and an intermediate portion 73 between the outer and inner end portions 71, 72. The valve housing 7 has an inner wall surface confining a longitudinal air passage 70 that extends from the outer end portion 71 through the inner end portion 72. The intermediate portion 73 is adapted to be mounted on the wheel rim 31 in an airtight manner such that the inner end portion 72 extends into the chamber confined by the wheel rim 31 and the pneumatic tire 32, and such that the outer end portion 71 extends outwardly from the wheel rim 31. In the preferred embodiment, the inner end portion 72 is formed with an external screw thread for engaging threadedly an air inlet of the pressure-sensing device 4. However, it should be noted that it is not absolutely necessary to form a mechanical connection between the inner end portion 72 and the pressure-sensing device 4.

The air valve member 8 is disposed inside the valve housing 7 proximate to the outer end portion 71. The biasing member 8' is disposed inside the valve housing 7 proximate to the inner end portion 72.

The air valve member 8 includes a valve seat 81 and a spring-loaded valve stem 80. The valve seat 81 includes a hollow cap body 810 and a hollow valve seat body 811. The cap body 810 is formed with an external screw thread for engaging threadedly an internal screw thread in the air passage 70. The cap body 810 has a first end provided with an end wall 8100, and an open second end opposite to the end wall 8100. The valve seat body 811 has a tubular end portion 8110 that extends slidably into the open second end of the cap body 810, and a tapering end portion 8111 that extends from the tubular end portion 8110 away from the cap body 810. The tapering end portion 8111 is wider than the tubular end portion 8110, and tapers in a direction away from the tubular end portion 8110. A seal ring 82, formed from an insulator material, is disposed around the tapering end portion 8111 and establishes an airtight seal between the tapering end portion 8111 and the inner wall surface of the valve housing 7. The cap body 810 is formed from an insulator material such that electric current flow from the valve housing 7 through the cap body 810 is not possible. The valve seat body 811 can be formed from an insulator material or an electrically conductive material. Even if the valve seat body 811 is formed from an electrically conductive material, the valve seat body 811 can be electrically insulated from the valve housing 7 because the cap body 810 and the seal ring 82 are both formed from an insulator material.

The valve stem 80 includes a stem body 80a that extends through the valve seat 81 and that is made from an electrically conductive material. The stem body 80a has a first end section disposed proximate to the outer end portion 71 of the valve housing 7, an intermediate section extending through the end wall 8100 of the cap body 810 and formed with a radial flange 800 for abutting against one side of the end wall 8100 that is disposed distal to the outer end portion 71 of the valve housing 7, and a second end section extending out of the valve seat body 811 and having a valve piece 801 connected thereto. The valve stem 80 further includes a coil spring 802 sleeved on the intermediate section of the stem body 80a and disposed in the valve seat 81. One end of the coil spring 802 abuts against the radial flange 800. The other end of the coil spring 802 abuts against the inner wall surface of the tapering end portion 8111 of the valve seat body 811. The coil spring 802 thus biases the stem body 80a such that the valve piece 801 closes sealingly an open end of the tapering end portion 8111 of the valve seat body 811, thereby blocking air flow through the valve seat 81. Due to the seal ring 82 and the valve piece 801, air in the tire 32 does not leak out of the valve housing 7.

Except for the valve piece 801, the construction of the biasing member 8' is similar to that of the air valve member 8. The biasing member 8' includes a seat member 81' and a spring-loaded biasing stem 80'. The seat member 81' is formed with an external screw thread for engaging threadedly an internal screw thread in the air passage 70. The portion of the seat member 81' that is in contact with the valve housing 7, e.g. the cap body 810', is made from an insulator material. The seat body 811' of the seat member 81' can be formed from an insulator material or an electrically conductive material. The biasing stem 80', which is formed from an electrically conductive material, extends through the seat member 81', and acts on the stem body 80a to bias the valve piece 801 to block air flow through the valve seat 81. The biasing stem 80' is in constant electrical contact with the stem body 80a.

When the force applied on the first end section of the stem body 80a is sufficient to counteract the forces of the coil spring 802 and the biasing stem 80', the stem body 80a will move relative to the valve seat 81 to compress the coil spring 802 and to result in corresponding movement of the biasing stem 80' relative to the seat member 81'. The valve piece 801 is thus moved away from the open end of the tapering end portion 8111 of the valve seat body 811, thereby permitting air to flow into and out of the valve housing 7 via the valve seat 81 and the seat member 81'.

Because the valve housing 7 is formed from an electrically conductive material, the valve housing 7 is inherently provided with a housing conductor. First and second conductive wires 84, 85 are connected electrically to the biasing stem 80' and the housing conductor of the valve housing 7, and are further connected electrically to the pressure-sensing device 4 on the wheel rim 31.

Referring to FIGS. 2 to 5, the battery housing 6 is formed from an electrically conductive material, and includes an internally threaded connecting portion 60 for mounting threadedly on the outer end portion 71 of the valve housing 7. The battery housing 6 further includes a battery confining portion 61 adapted to receive the battery cell 5 therein. The battery confining portion 61 has a surrounding wall formed with a peripheral slot 610 for access thereto. A battery seat 62 is inserted removably into the battery confining portion 61 via the peripheral slot 610. In this embodiment, the battery cell 5 is a lithium battery cell having a positive terminal side 51 and an opposite negative terminal side 52.

Figure 3:
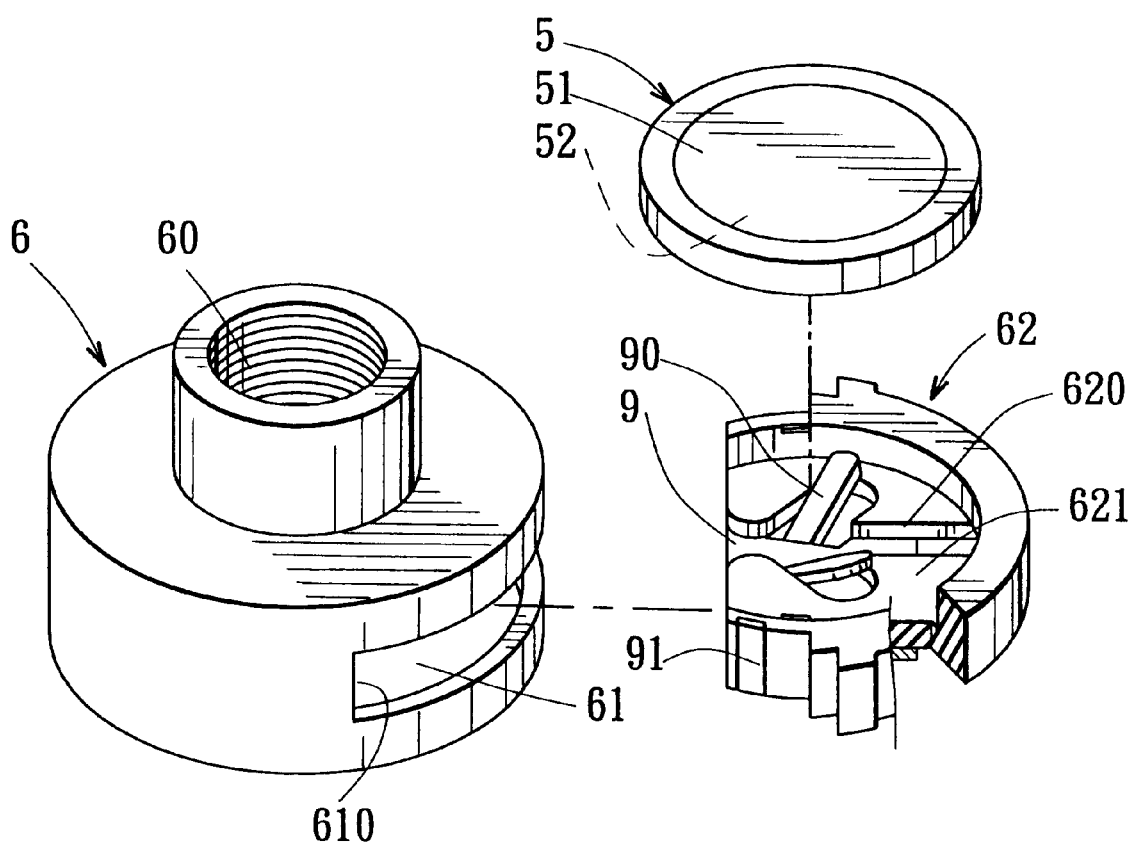
FIG. 3 is an inverted perspective exploded view illustrating a battery housing of the first preferred embodiment.
Figure 4:
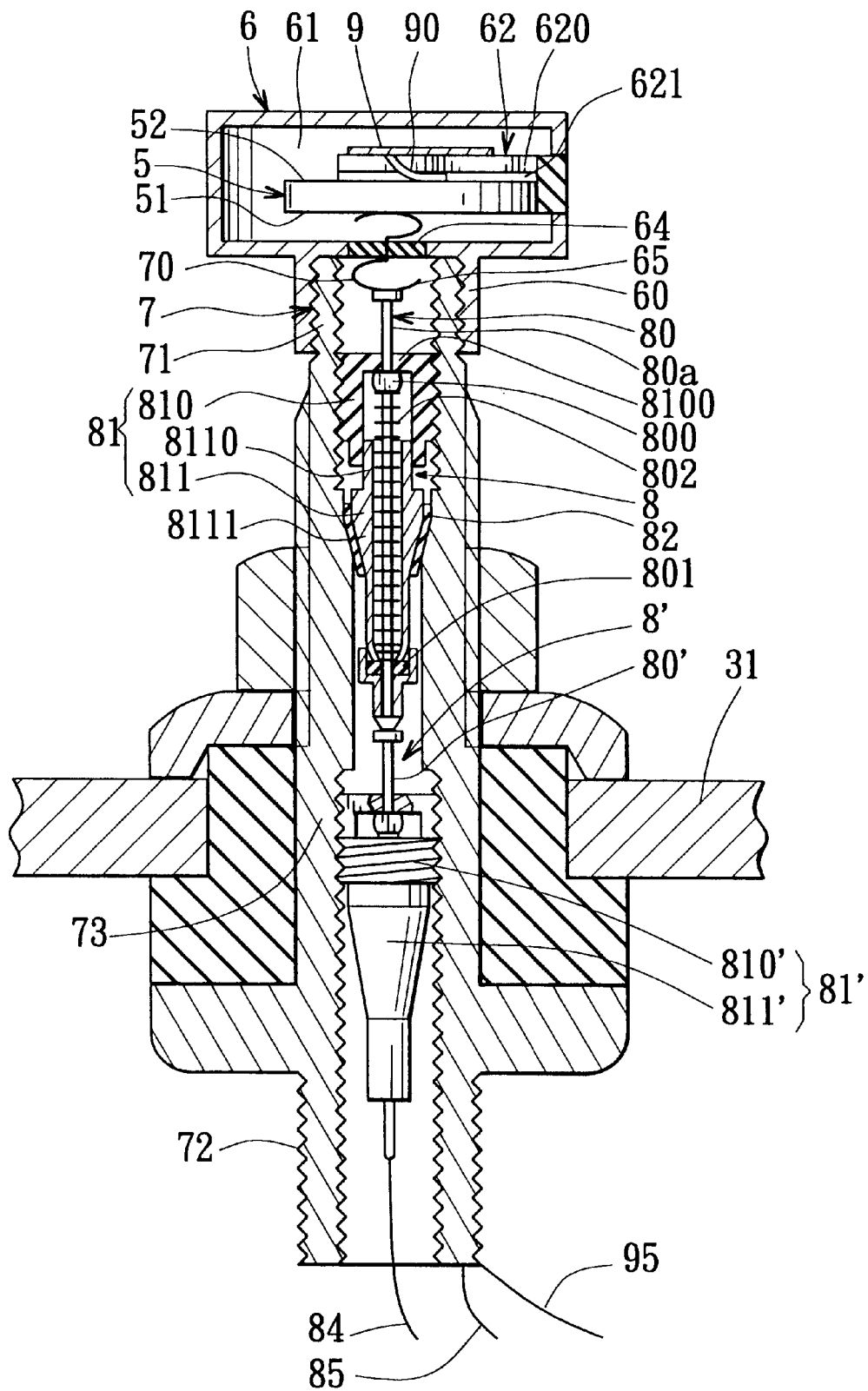
FIG. 4 is a schematic, assembled sectional view of the first preferred embodiment.
Figure 5:
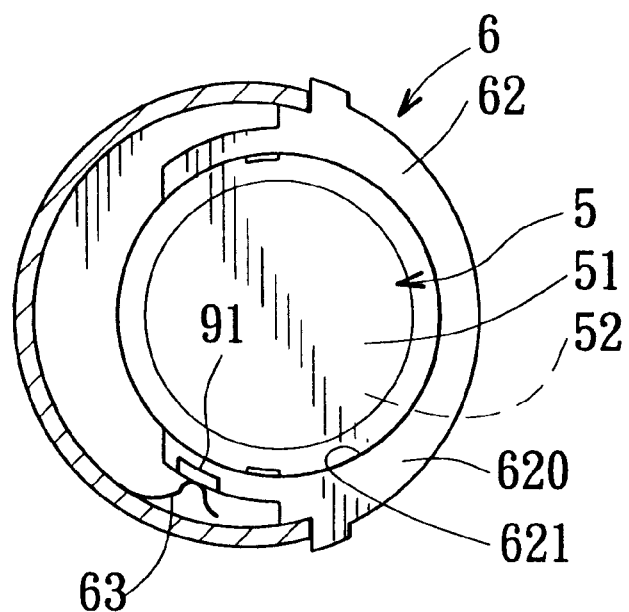
FIG. 5 is a schematic partly sectional view of the battery housing of FIG. 3.

The periphery of the battery cell 5 is connected electrically to the negative terminal side 52. The battery seat 62 has a support plate 620 formed from an insulator material. One side of the support plate 620 is formed with a recess 621 that is adapted to receive the battery cell 5 therein. A contactor plate 9 formed from an electrically conductive material is mounted on another side of the support plate 620 opposite to the recess 621, and is formed with a resilient first battery contact part 90 that extends into the recess 621 for contacting the negative terminal side 52 of the battery cell 5. The contactor plate 9 is further formed with a conductive extension 91 that is bent to extend along an outer periphery of the support plate 620. Preferably, as best shown in FIG. 3, the inner wall surface of the surrounding wall of the battery confining portion 61 is provided with a spring contact 63 for establishing physical contact with the conductive extension 91 when the battery seat 62 is inserted into the battery confining portion 61. As such, the battery housing 6 can be connected electrically with the negative terminal side 52 of the battery cell 5 via the contactor plate 9. In an alternative arrangement, the spring contact 63 can be integrated with the conductive extension 91 for establishing electrical connection with the battery housing 6.

At a junction of the battery confining portion 61 and the connecting portion 60, there is disposed a positioning member 64 formed from an insulator material. A conductive second battery contact 65 is mounted on the positioning member 64, and has a first portion that extends into the battery confining portion 61, and an opposite second portion that extends into the connecting portion 60. The first portion of the second battery contact 65 is adapted to abut against the positive terminal side 51 of the battery cell 5 when the latter is disposed in the battery confining portion 61. Because the battery cell 5 is disposed in the battery seat 62, which is formed from an insulator material, and because the second battery contact 65 is mounted on the positioning member 64, which is also formed from an insulator material, electrical connection between the positive terminal side 51 of the battery cell 5 and the battery housing 6 can be avoided.

When the battery housing 6 is mounted threadedly on the outer end portion 71 of the valve housing 7, the battery housing 6 is connected electrically to the valve housing 7 to connect the conductive wire 85 and, in turn, the pressure-sensing device 4 to the negative terminal side 52 of the battery cell 5. At the same time, the second portion of the second battery contact 65 abuts against the stem body 80a of the valve stem 80, thereby connecting electrically the conductive wire 84 and, in turn, the pressure-sensing device 4 to the positive terminal side 51 of the battery cell 5 via the stem body 80a and the biasing stem 80'. Electric power can thus be supplied to the pressure-sensing device 4 at this time.

When the stored power of the battery cell 5 has been used up, the battery seat 62 can be removed from the battery housing 6 externally of the airtight chamber formed between the wheel rim 31 and the pneumatic tire 32 to replace the battery cell 5. Replacement of the battery cell 5 is thus facilitated in the power supply unit of the present invention.

In actual design, the spring force of the second battery contact 65 is smaller than that of the coil spring 802 of the air valve member 8 to prevent erroneous operation of the air valve member 8.

Figure 6:
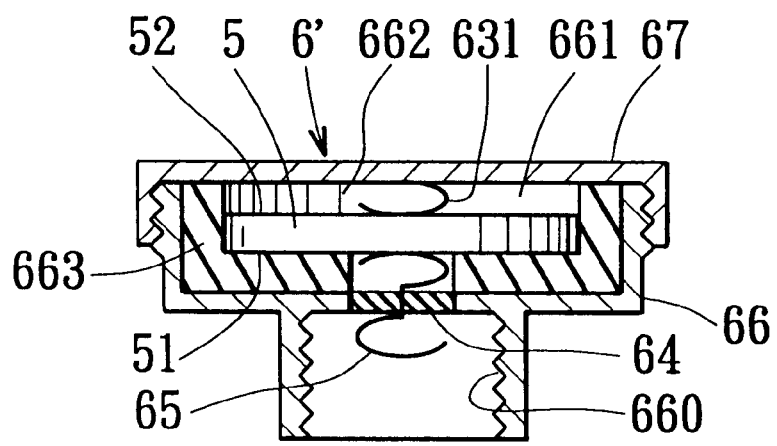
FIG. 6 is a schematic sectional view of a modified embodiment of a battery housing for the power supply unit of the present invention.

FIG. 6 illustrates a modified battery housing 6' of a power supply unit according to the present invention. The battery housing 6' includes a conductive mounting seat 66 and a conductive cover member 67. The mounting seat 66 includes an internally threaded connecting portion 660 for mounting threadedly on the outer end portion 71 of the valve housing 7 (see FIG. 2). The mounting seat 66 further includes a battery confining portion 661, and has an open end for access into the battery confining portion 661. A battery seat 663 is mounted removably in the battery confining portion 661. The battery seat 663 is formed from an insulator material and has one side formed with a recess 662 that is adapted to receive the battery cell 5 therein. As such, electrical connection between the battery cell 5 and the battery housing 6' is not possible via the battery seat 663. The cover member 67 is formed with an internal screw thread for engaging threadedly an external screw thread on the battery confining portion 661 of the mounting seat 66. As such, the cover member 67 can be mounted removably on the open end of the mounting seat 66 to close the battery confining portion 661 of the mounting seat 66 and retain the battery cell 5 in the latter. At a junction of the battery confining portion 661 and the connecting portion 660, there is disposed a positioning member 64 formed from an insulator material. A conductive second battery contact 65 is mounted on the positioning member 64, and has a first portion that extends into the battery confining portion 661, and an opposite second portion that extends into the connecting portion 660. The first portion of the second battery contact 65 extends through the battery seat 663 and into the recess 662 so as to be adapted to abut against the positive terminal side 51 of the battery cell 5 when the latter is disposed in the battery confining portion 661. The cover member 67 has an end wall provided with a conductive first battery contact 631 that is adapted to abut against the negative terminal side 52 of the battery cell 5, thereby establishing electrical connection between the battery housing 6' and the negative terminal side 52 of the battery cell 5.

Therefore, when the stored power of the battery cell 5 has been used up, the cover member 67 can be detached from the mounting seat 66 externally of the airtight chamber formed between the wheel rim 31 and the pneumatic tire 32 to replace the battery cell 5. Replacement of the battery cell 5 is thus facilitated.

Referring again to FIG. 2, in the first preferred embodiment, the valve housing 7 has the air valve member 8 and the biasing member 8' disposed therein. As such, in the event that the air valve member 8 is defective and has to be replaced, electrical connection with the pressure-sensing device 4 need not be disturbed since the conductive wires 84, 85 are connected to the biasing stem 80' of the biasing member 8' and the valve housing 7, respectively.

Figure 7:
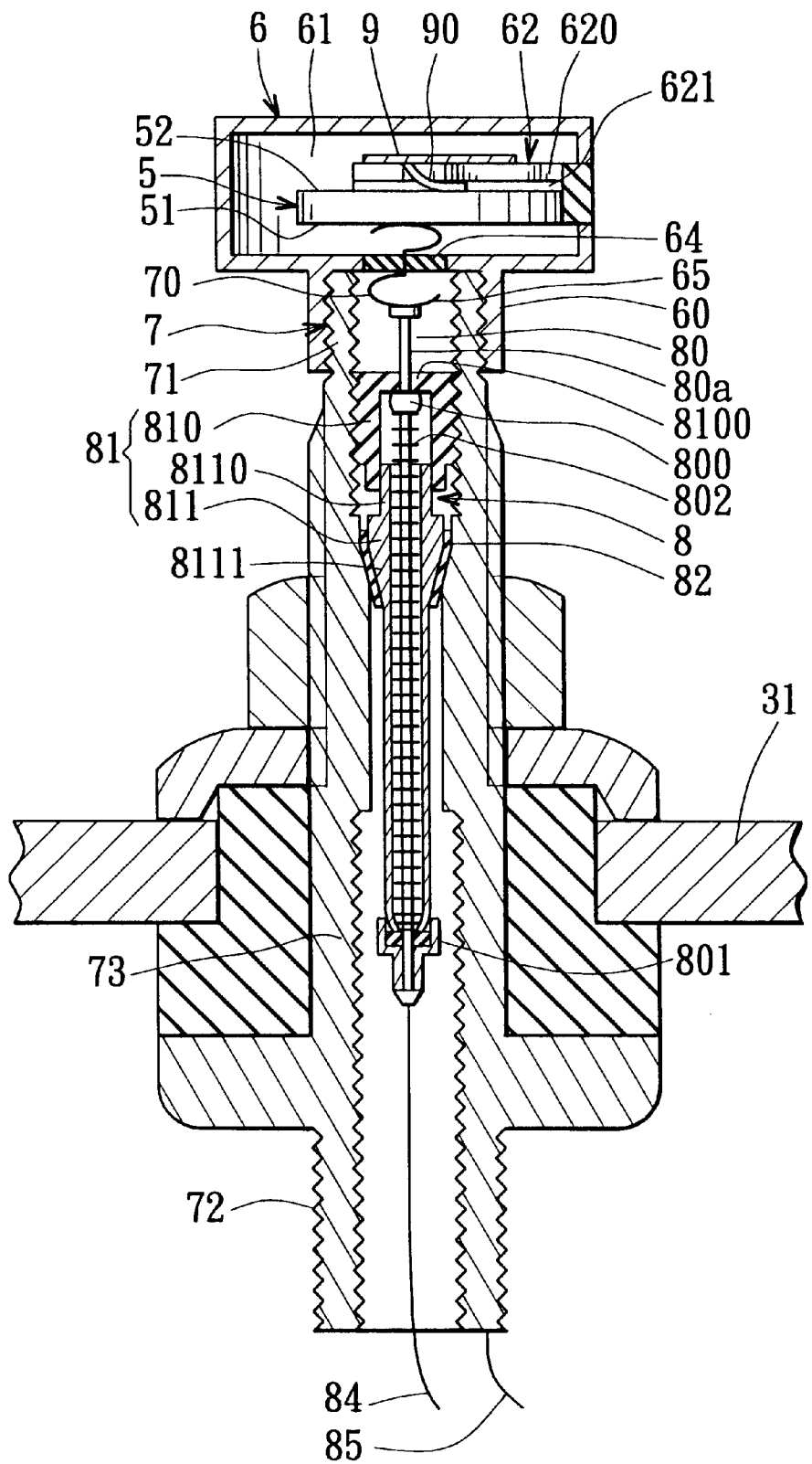
FIG. 7 is a schematic, assembled sectional view illustrating the second preferred embodiment of a power supply unit for a pressure-sensing device according to the present invention.

FIG. 7 illustrates the second preferred embodiment of a power supply unit according to the present invention. Unlike the previous embodiment, there is no biasing member 8'. Thus, the conductive wire 84 is connected directly to the stem body 80a of the valve stem 80. Replacement of the battery cell 5 is still convenient to conduct in this embodiment since the battery housing 6 is disposed externally of the airtight chamber formed between the wheel rim 31 and the pneumatic tire (not shown).

As to the connection between the pressure-sensing device 4 and the wheel rim 31, this is not critical to the present invention as long as the conductive wires 84, 85 can establish electrical connection between the power supply unit of this invention and the pressure-sensing device 4.

Preferably, the power supply unit further comprises a signal antenna 95 having one end connected electrically to the valve housing 7, and an opposite end adapted to be connected electrically to the pressure-sensing device 4. As such, a pressure signal generated by the pressure-sensing device 4 can be transmitted wirelessly via the signal antenna 95.

In the embodiments described beforehand, the battery housing 6, 6' and the valve housing 7 are both made from an electrically conductive material. However, it should be noted that it is not absolutely necessary to form the battery housing 6, 6' and the valve housing 7 from the conductive material. The battery housing 6, 6' and the valve housing 7 can be formed from an insulator material with a conductive coating or an embedded conductive circuit to achieve the same effect. For example, a valve housing formed from an insulator material can be embedded or adhered with a conductive circuit capable of establishing electrical connection with the contacts 63, 631 of the battery housing 6, 6'. In another example, a battery housing 6' formed from an insulator material can have the contacts 631, 65 embedded therein and extending out of the same so that, when the battery housing 6' is mounted on the valve housing 7, the contact 631 can establish electrical connection with the valve housing 7, while the battery contact 65 can establish electrical connection with the stem body 80a of the valve stem 80.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A power supply unit adapted for use with a pressure-sensing device for a vehicle wheel, the vehicle wheel including a wheel rim and a pneumatic tire mounted on the wheel rim so as to confine an airtight chamber therewith, the pressure-sensing device being mounted on the wheel rim inside the airtight chamber and being concealed by the pneumatic tire, said power supply unit comprising:

a tubular valve housing having an outer end portion, an inner end portion and an intermediate portion between said outer and inner end portions, said valve housing confining a longitudinal air passage that extends from said outer end portions through said inner end portion, said intermediate portion being adapted to be mounted on the wheel rim in an airtight manner such that said inner end portion extends into the airtight chamber and such that said outer end portion extends outwardly of the wheel rim, said valve housing being provided with a housing conductor that extends from said outer end portion to said inner end portion and that is adapted to be connected electrically to the pressure-sensing device;

an air valve member mounted in said air passage of said valve housing and operable so as to control air flow through said air passage, said air valve member including a spring-loaded valve stem with a conductive stem body that is adapted to be connected electrically to the pressure-sensing device, and insulation means for electrically insulating said stem body from said housing conductor; and a battery housing mounted on said outer end portion of said valve housing and adapted to receive a battery cell therein, said battery housing being provided with electrically isolated first and second battery contacts adapted to connect electrically and respectively with first and second terminals of the battery cell when the battery cell is received in said battery housing, said first and second battery contacts establishing electrical connection with said housing conductor and said conductive stem body, respectively, when said battery housing is mounted on said outer end portion of said valve housing, said battery housing including a connecting portion for removable mounting on said outer end portion of said valve housing, and a battery confining portion adapted to receive the battery cell therein, said first battery contact being provided in said battery confining portion, said second battery contact being mounted in said battery housing at a junction of said connecting portion and said battery confining portion, said valve housing and said battery housing being made from an electrically conductive material such that said valve housing is provided inherently with said housing conductor, and such that said first battery contact is connected electrically to said valve housing via said battery housing, said battery housing having a positioning member made from an insulator material and disposed at the junction of said connecting portion and said battery confining portion, said second battery contact being mounted on said positioning member and having a first portion that extends into said battery confining portion and that is adapted to contact the second terminal of the battery cell, and a second portion that extends into said connecting portion and that contacts said conductive stem body when said battery housing is mounted on said outer end portion of said valve.

2. The power supply unit as defined in claim 1, wherein said battery confining portion has a battery seat mounted removably therein, said battery seat having a support plate formed from an insulator material, said support plate having one side formed with a recess that is adapted to receive the battery cell therein, said battery seat further having a contactor plate made from an electrically conductive material and mounted on another side of said support plate opposite said recess, said contactor plate being formed with said first battery contact that extends into said recess and being further formed with a conductive extension for physical contact with said battery housing so as to be adapted to establish electrical connection between said battery housing and the first terminal of the battery cell.

3. The power supply unit as defined in claim 2, wherein said battery confining portion has a surrounding wall formed with a peripheral slot for access thereinto, said battery seat being inserted into said battery confining portion via said peripheral slot.

4. The power supply unit as defined in claim 1, wherein said connecting portion is mounted threadedly on said outer end portion of said valve housing.

5. A power supply unit adapted for use with a pressure-sensing device for a vehicle wheel, the vehicle wheel including a wheel rim and a pneumatic tire mounted on the wheel rim so as to confine an airtight chamber therewith, the pressure-sensing device being mounted on the wheel rim inside the airtight chamber and being concealed by the pneumatic tire, said power supply unit comprising:

a tubular valve housing having an outer end portion, an inner end portion and an intermediate portion between said outer and inner end portions, said valve housing confining a longitudinal air passage that extends from said outer end portions through said inner end portion, said intermediate portion being adapted to be mounted on the wheel rim in an airtight manner such that said inner end portion extends into the airtight chamber and such that said outer end portion extends outwardly of the wheel rim, said valve housing being provided with a housing conductor that extends from said outer end portion to said inner end portion and that is adapted to be connected electrically to the pressure-sensing device;

an air valve member mounted in said air passage of said valve housing and operable so as to control air flow through said air passage, said air valve member including a spring-loaded valve stem with a conductive stem body that is adapted to be connected electrically to the pressure-sensing device, and insulation means for electrically insulating said stem body from said housing conductor; and a battery housing mounted on said outer end portion of said valve housing and adapted to receive a battery cell therein, said battery housing being provided with electrically isolated first and second battery contacts adapted to connect electrically and respectively with first and second terminals of the battery cell when the battery cell is received in said battery housing, said first and second battery contacts establishing electrical connection with said housing conductor and said conductive stem body, respectively, when said battery housing is mounted on said outer end portion of said valve housing, said battery housing including a connecting portion for removable mounting on said outer end portion of said valve housing, and a battery confining portion adapted to receive the battery cell therein, said first battery contact being provided in said battery confining portion, said second battery contact being mounted in said battery housing at a junction of said connecting portion and said battery confining portion, said battery housing further including a mounting seat formed with said connecting portion and said battery confining portion, said mounting seat having an open end for access into said battery confining portion, said battery housing further including a cover member mounted removably on said open end of said mounting seat to close said battery confining portion.

6. The power supply unit as defined in claim 5, wherein said valve housing and said battery housing are made from an electrically conductive material such that said valve housing is provided inherently with said housing conductor, and such that said first battery contact is connected electrically to said valve housing via said battery housing.

7. The power supply unit as defined in claim 6, wherein said battery housing has a positioning member made from an insulator material and disposed at a junction of said connecting portion and said battery confining portion, said second battery contact being mounted on said positioning member and having a first portion that extends into said battery confining portion and that is adapted to contact the second terminal of the battery cell, and a second portion that extends into said connecting portion and that contacts said conductive stem body when said battery housing is mounted on said outer end portion of said valve housing.

8. The power supply unit as defined in claim 7, wherein said battery confining portion has a battery seat mounted removably therein, said battery seat being formed from an insulator material and having one side formed with a recess that is adapted to receive the battery cell therein, said first battery contact being provided on said cover member, said first portion of said second battery contact extending into said recess of said battery seat so as to be adapted to contact the second terminal of the battery cell.

9. A power supply unit adapted for use with a pressure-sensing device for a vehicle wheel, the vehicle wheel including a wheel rim and a pneumatic tire mounted on the wheel rim so as to confine an airtight chamber therewith, the pressure-sensing device being mounted on the wheel rim inside the airtight chamber and being concealed by the pneumatic tire, said power supply unit comprising:

a tubular valve housing having an outer end portion, an inner end portion and an intermediate portion between said outer and inner end portions, said valve housing confining a longitudinal air passage that extends from said outer end portions through said inner end portion, said intermediate portion being adapted to be mounted on the wheel rim in an airtight manner such that said inner end portion extends into the airtight chamber and such that said outer end portion extends outwardly of the wheel rim, said valve housing being provided with a housing conductor that extends from said outer end portion to said inner end portion and that is adapted to be connected electrically to the pressure-sensing device;

an air valve member mounted in said air passage of said valve housing and operable so as to control air flow through said air passage, said air valve member including a spring-loaded valve stem with a conductive stem body that is adapted to be connected electrically to the pressure-sensing device, and insulation means for electrically insulating said stem body from said housing conductor; and a battery housing mounted on said outer end portion of said valve housing and adapted to receive a battery cell therein, said battery housing being provided with electrically isolated first and second battery contacts adapted to connect electrically and respectively with first and second terminals of the battery cell when the battery cell is received in said battery housing, said first and second battery contacts establishing electrical connection with said housing conductor and said conductive stem body, respectively, when said battery housing is mounted on said outer end portion of said valve housing.

said air valve member further including a hollow valve seat mounted in said air passage, said stem body of said valve stem having one end that extends through said valve seat and that is provided with a valve piece, said valve stem further including a coil spring disposed around said stem body inside said valve seat so as to bias said stem body such that said valve piece normally blocks the air flow through said valve seat.

10. The power supply unit as defined in claim 9, wherein said valve seat is made from an insulator material and serves as said insulation means.

11. The power supply unit as defined in claim 9, wherein said valve seat is made from an electrically conductive material and has a seal ring disposed therearound for establishing an airtight seal with said valve housing, said seal ring being formed from an insulator material and serving as said insulation means.

12. The power supply unit as defined in claim 1, wherein said air valve member is mounted in said air passage proximate said outer end portion of said valve housing, said power supply unit further comprising a biasing member mounted in said air passage proximate to said inner end portion of said valve housing, said biasing member including a spring-loaded biasing stem made from an electrically conductive material, said biasing stem having one end acting on said stem body of said valve stem and an opposite end that is adapted to be connected electrically to the pressure-sensing device such that electrical connection between said stem body and the pressure-sensing device is established via said biasing stem.

13. A power supply unit adapted for use with a pressure-sensing device for a vehicle wheel, the vehicle wheel including a wheel rim and a pneumatic tire mounted on the wheel rim so as to confine an airtight chamber therewith, the pressure-sensing device being mounted on the wheel rim inside the airtight chamber and being concealed by the pneumatic tire, said power supply unit comprising:

a tubular valve housing having an outer end portion, an inner end portion and an intermediate portion between said outer and inner end portions, said valve housing confining a longitudinal air passage that extends from said outer end portions through said inner end portion, said intermediate portion being adapted to be mounted on the wheel rim in an airtight manner such that said inner end portion extends into the airtight chamber and such that said outer end portion extends outwardly of the wheel rim, said valve housing being provided with a housing conductor that extends from said outer end portion to said inner end portion and that is adapted to be connected electrically to the pressure-sensing device;

an air valve member mounted in said air passage of said valve housing and operable so as to control air flow through said air passage, said air valve member including a spring-loaded valve stem with a conductive stem body that is adapted to be connected electrically to the pressure-sensing device, and insulation means for electrically insulating said stem body from said housing conductor; and a battery housing mounted on said outer end portion of said valve housing and adapted to receive a battery cell therein, said battery housing being provided with electrically isolated first and second battery contacts adapted to connect electrically and respectively with first and second terminals of the battery cell when the battery cell is received in said battery housing, said first and second battery contacts establishing electrical connection with said housing conductor and said conductive stem body, respectively, when said battery housing is mounted on said outer end portion of said valve housing, said battery housing including a connecting portion for removable mounting on said outer end portion of said valve housing, and a battery confining portion adapted to receive the battery cell therein, said first battery contact being provided in said battery confining portion, said second battery contact being mounted in said battery housing at a junction of said connecting portion and said battery confining portion, said valve housing and said battery housing being made from an electrically conductive material such that said valve housing is provided inherently with said housing conductor, and such that said first battery contact is connected electrically to said valve housing via said battery housing, and a signal antenna having one end connected electrically to said valve housing, and an opposite end adapted to be connected electrically to the pressure-sensing device, said signal antenna being adapted to transmit wirelessly a pressure signal generated by the pressure-sensing device.

14. The power supply unit as defined in claim 6, further comprising a signal antenna having one end connected electrically to said valve housing, and an opposite end adapted to be connected electrically to the pressure-sensing device, said signal antenna being adapted to transmit wirelessly a pressure signal generated by the pressure-sensing device.

* * * * *